June 7, 1932. C. C. BERTRAM 1,862,173
REVERSING GEAR MECHANISM
Filed July 31, 1920 3 Sheets-Sheet 2
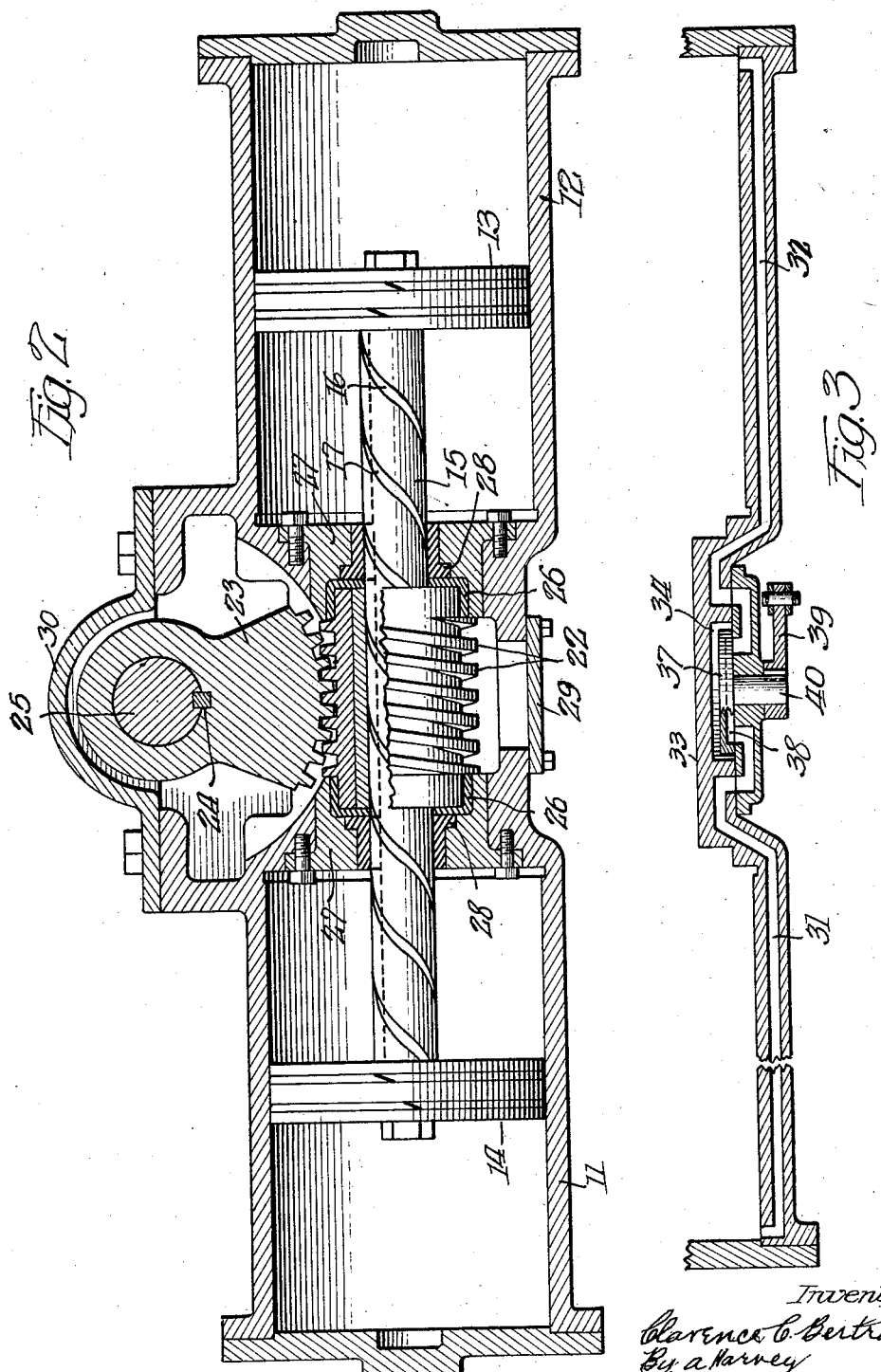

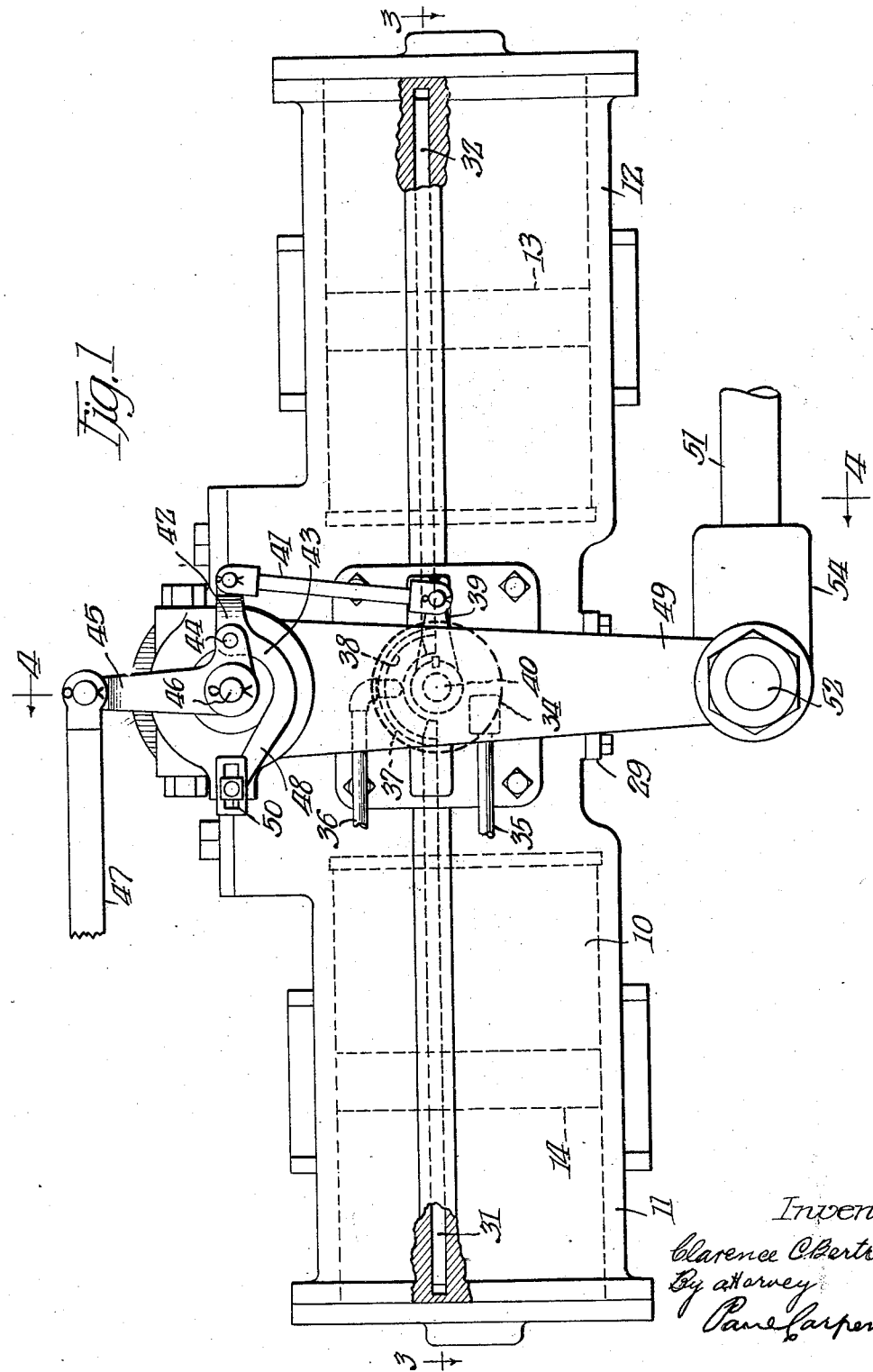

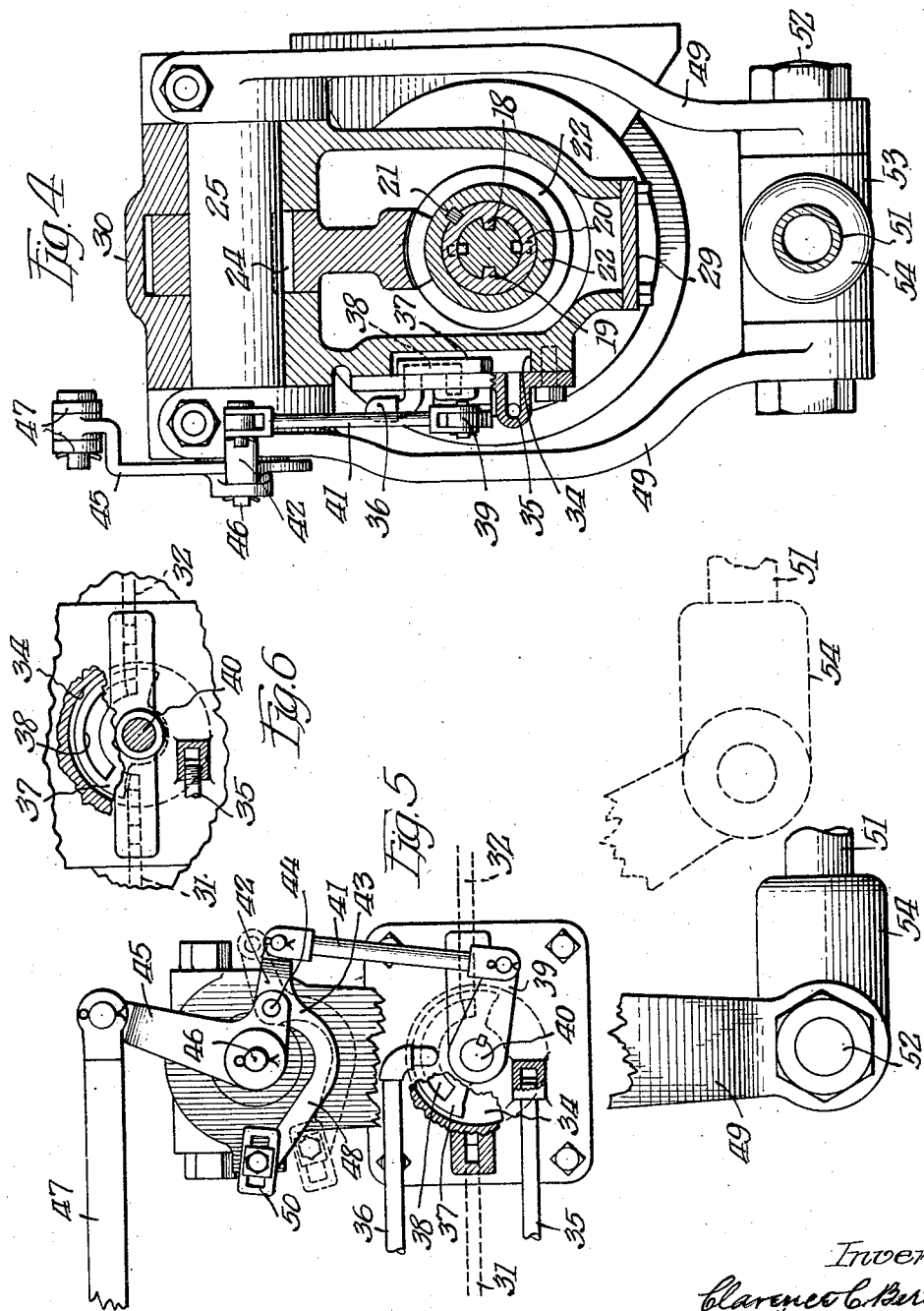

Patented June 7, 1932

1,862,173

UNITED STATES PATENT OFFICE

CLARENCE C. BERTRAM, OF CHICAGO, ILLINOIS, ASSIGNOR TO BARCO MANUFACTURING COMPANY, OF CHICAGO, ILLINOIS, A CORPORATION OF ILLINOIS

REVERSING GEAR MECHANISM

Application filed July 31, 1920. Serial No. 400,502.

The present invention relates in general to reversing gear mechanism and more particularly to mechanism of the character referred to operable by mechanical power, and has special reference to the provision of an improved form of fluid-pressure driven reversing gear mechanism.

The principal objects of the present invention are the provision of an improved form of fluid-operated reversing gear mechanism; the provision of an improved gearing, and more particularly, irreversible gearing, for establishing a driving connection between a suitably driven element and the mechanism to be moved thereby; the provision of an improved valve mechanism for controlling the flow of fluid to parts to be actuated; the provision in general of an improved arrangement of motion transmitting elements, and more specifically one adapted for operating a controlling valve; together with such further and additional objects as may be below set forth.

Mechanisms of the character referred to have a general field of usefulness, and are of particular utility in the operation of the valve-mechanism of large steam engines.

For purposes of illustration, therefore, the inventions have been shown structurally embodied in form adapted for employment as gearing for opening and closing or varying the degree of cut-off, and reversing, the valve-mechanism of railway locomotive engines.

In the accompanying drawings, therefore,—

Figure 1 is a longitudinal elevational view of the casings of the improved mechanisms, together with the elements extending respectively to the engineer's cab and to the tumbling shaft of the locomotive;

Figure 2 is a longitudinal sectional view, taken substantially centrally of Figure 1;

Figure 3 is a fragmentary longitudinal view taken on the line 3—3 of Figure 1 illustrative of certain details of the controlling valve mechanism and the associated ports and passages;

Figure 4 is a sectional view taken on the line 4—4 of Figure 1;

Figure 5 is a fragmentary elevational view, partly in section, illustrating the controlling valve mechanism, the means for operating it, and positions assumed by the connection to the valve gear, one thereof being indicated in dotted lines; and Figure 6 is another fragmentary view, partly in section, illustrative of another aspect of the valve device.

Referring first to Figures 1 and 2 of the drawings, it will be noted that I have shown a cylinder casing structure comprising divided cylinder portions 11 and 12 within which is mounted a duplex piston structure including piston-heads 13 and 14 connected by a piston rod 15.

As will be hereinafter more fully explained, the cylinder portions 11 and 12 are provided with means for admitting fluid under pressure for the operation of the piston structure.

The piston structure reciprocates in the cylinder structure and is prevented from rotation in any convenient manner, such as by the employment of a spline.

The piston rod 15 has a double spiral groove 16, 17 with which engage projections 18, 19 on a sleeve 20 (Figure 4). As a result of this symmetrical arrangement, a balanced operative connection is attained, and shearing of the projections 18, 19 is rendered unlikely. To the sleeve 20 there is keyed, as indicated at 21, a spiral worm 22, engaging a toothed segment 23, in turn keyed as indicated at 24 on a shaft 25 mounted in the casing 10.

Again reverting to Figure 2, it will be noted that the spiral grooves 16 and 17 are of such a character as to permit a number of turns thereof about the rod 15, and as a result of this arrangement, it is possible to form the spirals of the worm 22 quite closely together, in order to obviate the possibility of undesired reversing of the movement of the segment 23.

The two sleeves 20, 22 are preferably coterminous and are conveniently closed at their ends by retaining members 26, 26 which serve as dust caps.

It will be apparent that by making the spiral gear in two parts as by providing the two separable nested sleeves 20, 22, injury to or wear of either of the sleeves will not require discarding of both.

Step-bushings 27, 27 are provided at each end of the spiral gear, and are provided with step-bearings 28 which serve not only to support the rod 15 but also as abutment members for the gear 22 and as retainers for the hub-caps 26.

The hollow center of the casing structure, above described, is provided with suitable cap pieces 29 and 30 forming a lubricant cellar for the several gearing elements.

From the foregoing description it will be perceived that a quite compact and well-balanced structure has been provided. Furthermore, all of the moving parts are not only so enclosed as to keep out extraneous matter such as dust and moisture but also full lubrication is assured.

As means for the operation of the piston structure, there is formed within the casing passages 31, 32 for the purposes of admitting and exhausting fluid under pressure to and from the opposite ends of the casing structure. This admission and exhaustion of fluid is controlled by a valve mechanism shown generally at 33 in Figures 3, 5, and 6.

The said controlling valve structure includes a valve chamber 34 with which the passages 31 and 32 communicate.

Fluid under pressure is introduced into the chamber 34 by means of a pipe 35 connected to a suitable source of supply (not shown) and controlled by a cab-valve under the hand of the engineer. From the chamber 34 exhausted fluid is conducted by a pipe 36.

For establishing the desired communications between the various passages and ports, there is employed a suitable valve disposed in the chamber 34. This valve is conveniently one of internal rotating segmental disc type 37 provided with segmental groove 38.

It will be apparent on viewing Figures 5 and 6 of the drawings that the contour of the disc 37 is such that the orifices of both of the passages 31 and 32 are covered in one position of the disc, hereafter referred to as "lap" position, and whenever the disc is moved in either direction from such lap position, the groove 38 will bring one of the passages 31, 32 into register with the exhaust line 36 and at the same time the orifice of the other of such passages with the inlet 35 and permit the influx of fluid under pressure, thus insuring at all times an equilibrium of pressure against the several piston heads and permitting the valve-gear to be set at any desired cut-off and held against creeping. It will be readily discerned that all of the desired functions of the controlling valve mechanism are accomplished by the use of but a single moving valve member.

As means for operating the valve mechanism, that is, for turning the disc 37 to any desired extent, there is employed a link 39 fixed on the stem 40 of the valve 37. Such link is pivotally connected by a rod 41 to one arm 42 of a bell-crank lever 43, in turn pivoted at 44 to another bell-crank lever 45 mounted on a pivot 46. The bell-crank lever 45 is moved about the pivot point 46 by means of the so-called "short-reach rod" 47 operable by a lever (not shown) under the hand of the engineer.

From the foregoing description it will be understood that by manipulation of his lever and thereby movement of the "short-reach rod" 47, the engineer can move the disc 37 into any desired position and thereby not only impart such forward or reverse movement to the locomotive as may be desired, but also set and hold the valve-gear at any desired cut-off.

For the purpose of restoring the valve 37 from any off-lap position to lap position, after imparting the necessary movement to the piston rod 15 and associated parts, and thereby holding the valve-gear at the desired cut-off, the arm 48 of the bell-crank lever 43 is connected to the link 49 by means of the pin-and-slot connection 50.

Obviously, the link 49 is suitably pivoted to and imparts movement to the "long-reach rod" 51 in a manner shortly to be described.

Comparison of Figures 1 and 5 will render manifest the several positions assumed by the several bell-crank levers 43 and 45 when the valve 37 is on lap and off-lap. When the valve 37 is moved to an off-lap position, as for example as shown in Figure 5, the shaft 25 will be oscillated as hereinbelow clearly set forth and will in turn actuate the valve-gear through the "long-reach rod" 51 and the lever 49, as shortly to be referred to.

The movement of the lever 49 will in turn actuate the bell-crank lever 43 through the pin-and-slot connection 50 and move said lever 43 to the position indicated in dotted lines in Figure 5, thus restoring the valve 37 to lap position.

On referring to Figure 4, it will be seen that the "long-reach rod" 51, by means of which connection is made to the valve-gear, is actuated from the shaft 25 of the segment 23 by means of the pair of levers 49 forming a yoke secured at one end to the shaft 25 and at the other end to a coupling pin 52 carrying a spacing bushing 53, having a boss 54 in which the "long-reach rod" 51 is fixed.

It will be apparent that the levers 49 are symmetrically arranged on both sides of the casing 10 so as to transmit movement from the shaft 25 to the reach rod in such a manner that the stresses are well balanced and any tendency toward twisting or skewing is avoided.

Having thus described my invention and illustrated its use, what I claim as new and desire to secure by Letters Patent is—

1. In a reversing gear mechanism, in combination, a toothed segment, a worm operably connected to said segment, a reciprocating member for rotating said worm, a cylinder, a piston in said cylinder operatively connected to said member, said worm adapted to act as a seal and gland at the portion where it engages said reciprocating member, and a fluid tight casing enclosing said worm and segment for containing lubricant which is adapted to be agitated by fluid pressure set up upon operation of said piston in said cylinder.

2. In a reversing gear mechanism, an oscillating member, a reciprocating member and means for oscillating said first mentioned member upon reciprocation of said second member comprising two nested sleeves arranged for simultaneous rotation, one of said sleeves being geared to the oscillating member, and means engaging the ends of said sleeves for retaining them in predetermined relation and for preventing the admission of extraneous matter between them.

3. In a reversing gear mechanism, a segmental gear member and a reciprocating member and means for actuating said segmental gear member upon reciprocation of said reciprocating member comprising two nested sleeves arranged for simultaneous rotation, one of said sleeves being connected to said segmental gear, means engaging the ends of said sleeves for retaining them in predetermined relation and for preventing the admission of extraneous matter between them, a shaft on which said segmental gear is mounted, and a U-shaped yoke member having spaced arms connected to the shaft at spaced points and connected to a reach rod at the opposite end, said segmental gear being connected to said sleeves intermediately in respect to said shaft and the end to which said reach rod is connected.

4. In a reversing gear mechanism, an oscillating member, a reciprocating member and means for oscillating said first mentioned member upon reciprocation of said second member comprising two nested sleeves arranged for simultaneous rotation and end retaining caps mounted upon the ends of said sleeves for retaining them in predetermined relation and for preventing the admission of extraneous matter between them.

5. In a reversing gear mechanism, a toothed segment, a reciprocating member and means for oscillating said segment upon reciprocation of said member comprising nested sleeves, one of which is in engagement with said segment and the other in engagement with said reciprocating member, and end retaining caps mounted upon said sleeves for retaining them in predetermined relation and for preventing the admission of extraneous matter between them.

6. In a reversing gear mechanism, in combination, a toothed segment, a worm engaging said segment, a member for rotating said worm, a cylinder, a piston operable therein, and a casing enclosing all of said mechanism and forming a part of said cylinder, and bearings for said segment and worm.

7. In a reversing gear mechanism, in combination, a toothed segment, a worm engaging said segment, a member for rotating said worm, a cylinder, a piston operable therein, and a casing enclosing said segment, worm and operating member, said casing forming bearings for said elements and forming an integral part of said cylinder.

In testimony whereof I have hereunto signed my name.

CLARENCE C. BERTRAM.